US009656412B2

(12) United States Patent
Seegel et al.

(10) Patent No.: US 9,656,412 B2
(45) Date of Patent: May 23, 2017

(54) METHOD AND DEVICE FOR PRODUCING A FIBRE COMPOSITE COMPONENT

(71) Applicant: AIRBUS OPERATIONS GMBH, Hamburg (DE)

(72) Inventors: Hauke Seegel, Abbenfleth/Stade (DE); Paulin Fideu, Stade (DE); Axel Herrmann, Stade (DE)

(73) Assignee: Airbus Operations GmbH, Hamburg (DE)

( * ) Notice: Subject to any disclaimer, the term of this patent is extended or adjusted under 35 U.S.C. 154(b) by 650 days.

(21) Appl. No.: 14/029,242

(22) Filed: Sep. 17, 2013

(65) Prior Publication Data
US 2014/0084508 A1 Mar. 27, 2014

Related U.S. Application Data

(63) Continuation of application No. PCT/EP2012/054638, filed on Mar. 16, 2012.
(Continued)

(30) Foreign Application Priority Data

Mar. 24, 2011 (DE) ........................ 10 2011 006 047

(51) Int. Cl.
*B29C 33/00* (2006.01)
*B29C 70/44* (2006.01)
(Continued)

(52) U.S. Cl.
CPC ........ *B29C 33/0038* (2013.01); *B29C 70/443* (2013.01); *B29C 70/48* (2013.01); *B29C 70/54* (2013.01); *F16J 15/08* (2013.01)

(58) Field of Classification Search
USPC ........................................................ 264/225
See application file for complete search history.

(56) References Cited

U.S. PATENT DOCUMENTS

| 5,543,159 A | 8/1996 | Iltgen |
| 8,137,499 B2 | 3/2012 | Luebbering et al. |

(Continued)

FOREIGN PATENT DOCUMENTS

| DE | 10 2007 061 431 | 6/2009 |
| EP | 2 441 556 | 4/2012 |

(Continued)

OTHER PUBLICATIONS

German Office Action for Application No. 10 2011 006 047.2 dated Oct. 21, 2011.
(Continued)

*Primary Examiner* — Matthew Daniels
*Assistant Examiner* — Kimberly A Stewart
(74) *Attorney, Agent, or Firm* — Jenkins, Wilson, Taylor & Hunt, P.A.

(57) ABSTRACT

The present invention provides a method for producing a fiber composite component, the method comprising arranging a first and a second mold in relation to one another in such a way that these together form a first cavity; laying a fiber material on the first and/or second mold; filling the first cavity with a casting material and solidifying the casting material in order to seal the first and second molds to one another and/or to interconnect them; and infiltrating the fiber material with a matrix and curing the matrix to form the fiber composite component.

15 Claims, 3 Drawing Sheets

Related U.S. Application Data

(60) Provisional application No. 61/467,181, filed on Mar. 24, 2011.

(51) Int. Cl.
    *B29C 70/54*     (2006.01)
    *B29C 70/48*     (2006.01)
    *F16J 15/08*     (2006.01)

(56) References Cited

U.S. PATENT DOCUMENTS

| | | |
|---|---|---|
| 2002/0015754 A1 | 2/2002 | Cundiff et al. |
| 2004/0113302 A1* | 6/2004 | La Forest ............... B29C 70/48 264/29.1 |
| 2005/0126390 A1* | 6/2005 | Fortin ........................ C08J 5/04 92/103 F |
| 2012/0152461 A1 | 6/2012 | Luebbering et al. |

FOREIGN PATENT DOCUMENTS

| | | | | |
|---|---|---|---|---|
| JP | 2003-136210 | * | 5/2003 | ............. B22D 17/14 |
| JP | 2003 136210 | | 5/2003 | |
| WO | WO 2010/040359 | | 4/2010 | |

OTHER PUBLICATIONS

International Search Report and Written Opinion for Application No. PCT/EP2012/054638 dated Jun. 26, 2012.

\* cited by examiner

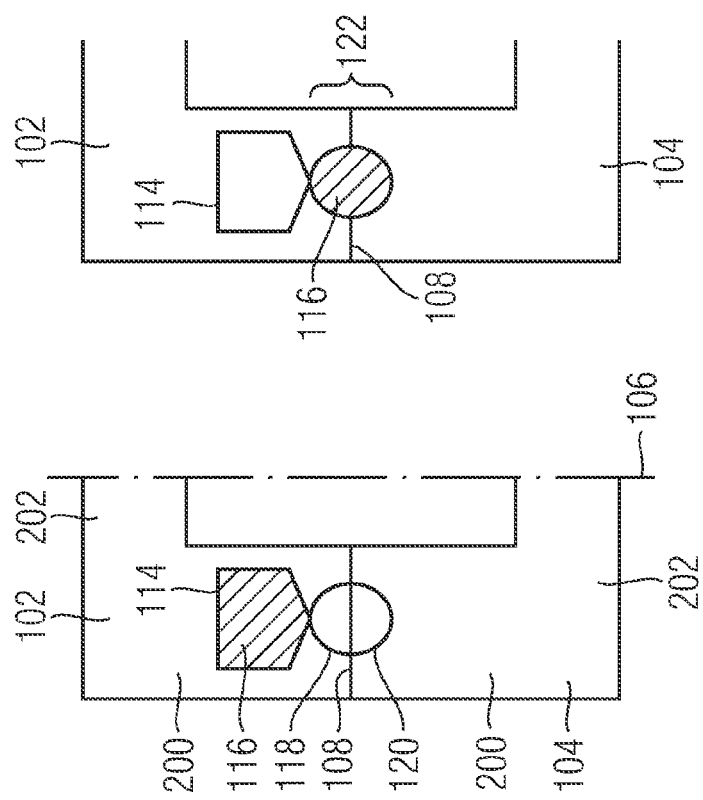

METHOD AND DEVICE FOR PRODUCING A FIBRE COMPOSITE COMPONENT

CROSS-REFERENCES TO RELATED APPLICATIONS

This application is a continuation of and claims priority to PCT/EP2012/054638, filed Mar. 16, 2012, which claims the benefit of and priority to U.S. Provisional Application No. 61/467,181, filed Mar. 24, 2011, and German Patent Application No. 10 2011 006 047.2, filed Mar. 24, 2011, the entire disclosures of which are herein incorporated by reference.

FIELD OF THE INVENTION

The present invention relates to a method and a device for producing a fiber composite component.

BACKGROUND OF THE INVENTION

The production of fiber composite components via infusion and injection methods is generally known. For example, in what is known as "resin transfer molding", a device which comprises a lower and an upper mold is used. A fiber material is arranged in a cavity formed between the two molds, whereupon a vacuum is applied to the cavity and at the same time a matrix under pressure is injected into the cavity. However, it is necessary to seal the two molds to one another beforehand. This is achieved in a known manner by providing elastomeric sealing profiles between the two molds. In order for the seal ensured by means of the sealing profiles to be sufficient to maintain the vacuum, the molds must also be pressed together with a high pressing force. A pressing force of this type is generally provided by complex hydraulics, which are expensive. It has also been found that in some cases sufficient tightness cannot be achieved, despite the high pressing force.

In a vacuum infusion method described in DE 10 2007 061 431 A1, a fiber material is arranged on a laminating device and covered with a vacuum film. In order to achieve sufficient tightness between the vacuum film and the laminating device, corresponding sealing tapes, also referred to as "tacky tape", are inserted between the vacuum film and the laminating device.

SUMMARY OF THE INVENTION

An idea of the present invention is to provide an improved method and an improved device for producing a fiber composite component, which in particular at least reduce the above-described drawbacks.

According to the invention, the following are provided:

A method for producing a fiber composite component, comprising the following steps: arranging a first and a second mold in relation to one another in such a way that these together form a first cavity, laying a fiber material on the first and/or second mold, filling the formed first cavity with a casting material and solidifying said casting material in order to seal the first and the second mold to one another and/or interconnect them, infiltrating the fiber material with a matrix and curing said matrix to form the fiber composite component.

Additionally, a device for producing a fiber composite component, in particular for carrying out the method according to the invention, comprising a first and a second mold which together form a first cavity, a means for melting a casting material for filling the formed first cavity and solidifying the casting material therein in order to seal the first and the second mold to one another and/or interconnect them, a means for infiltrating with a matrix a fiber material which can be arranged on the first and/or second mold, and a means for curing the matrix to form the fiber composite component.

The idea on which the present invention is based consists in providing tightness between a first and a second mold by means of a casting material and/or interconnecting a first and a second mold by means of a casting material.

The use of a casting material is associated with the advantage that a very high degree of tightness can be achieved without having to exert a pressing force on the two molds. In addition, by means of the casting material a connection between the first and the second mold can be provided in a simple manner.

In particular, when solidified the solidified casting material seals a joint between the first and the second mold. Additionally or alternatively, the solidified casting material interconnects the two molds with a positive fit in the region of their joint.

A large number of applications of the method according to the invention and the device according to the invention are contemplated. For example, the two molds can be interconnected and/or sealed to one another in order together to form a substantially planar or contoured laminating device on which a fiber composite component is constructed. The first and the second mold can also be interconnected and/or sealed to one another in order together to form a mold core by means of which a fiber composite component is constructed. In this case, the mold core occupies in particular a cavity of the formed fiber composite component. The two molds can also be interconnected and/or sealed to one another in order to form a second cavity in which the fiber material is infiltrated with the matrix.

The order of the steps given in the method claim can be varied. In particular, the step of arranging the fiber material on the first and/or the second mold can take place before or after the step of arranging the first and the second mold in relation to one another in such a way that the first and the second recess together form a first cavity.

Advantageous configurations of the present invention emerge from the dependent claims.

"fiber material" is understood herein to mean in particular a woven fabric, a non-woven fabric or a fiber mat. "Matrix" is to be understood to mean in particular a thermosetting or thermoplastic matrix.

"Infiltration" is to be understood to mean providing the fiber material with a matrix in any manner. In particular, "infiltration" includes infusion and injection methods.

According to a configuration of the method according to the invention, the first mold comprises a first recess and the second mold comprises a second recess, which recesses together form the first cavity. As a result, the first cavity is created in a simple manner. Alternatively, it is also possible for only one of the two molds to comprise a recess, which together with a planar face of the respective other mold forms the first cavity.

According to a configuration of the method according to the invention, a chamber contains the casting material prior to the filling step, the casting material flowing from the chamber into the first cavity when said material is heated beyond its melting point. As a result, the casting material can be transferred between the chamber and the cavity in a simple manner, in particular merely by controlling the temperature of the casting material.

According to a further configuration of the method according to the invention, the chamber is formed in the first and/or the second mold. This results in a compact construction. Alternatively, the chamber can also be provided outside the two molds.

According to a further configuration of the method according to the invention, the chamber is arranged above the first cavity prior to the filling step. The casting material thus flows from the chamber into the first cavity automatically under the effect of gravity.

According to a further configuration of the method according to the invention, the first and the second recess each comprise an undercut, in such a way that the first and the second mold are interconnected with a positive fit after filling with and solidification of the casting material. As a result, a rigid connection between the first and the second mold can be produced in a simple manner.

According to a further configuration of the method according to the invention, the casting material is re-melted after the matrix has been cured, whereby the seal and/or the connection between the first and the second mold is removed. As a result, the seal and/or the in particular positive connection between the first and the second mold can easily be removed again. There is also the option of turning the first and the second mold over prior to re-melting the casting material, in such a way that the first cavity is arranged above the chamber, whereby the casting material flows from the first cavity back into the chamber once it has been melted.

According to a further configuration of the method according to the invention, the first and the second mold are arranged in relation to one another in such a way that they together form a second cavity, at least in portions, which cavity receives the fiber material, whereupon the first and the second mold are sealed to one another by filling the first cavity with the casting material and solidifying said casting material. "Together form a second cavity, at least in portions" is to be understood to mean that the first and the second mold can form only a part of a wall defining the second cavity. For example, a third and a fourth mold which are formed in accordance with the first and the second molds can also be provided, in such a way that the second cavity is defined by a total of four molds. The first and the second molds can thus for example be formed as two half-shells which form between them the second cavity. Alternatively, the first, second, third and fourth molds can each be formed as a quarter-shell, which quarter-shells form between them the second cavity. The two molds are preferably also interconnected with a positive fit by filling with the casting material and solidifying it.

According to a further configuration of the method according to the invention, a pressure or vacuum is applied to the second cavity in order to infiltrate the fiber material in the second cavity with the matrix. This configuration basically corresponds to what is known per se as "resin transfer molding" (hereinafter "RTM method").

According to a further configuration of the method according to the invention, the fiber material is packed in a film which is sealed from the first and the second mold, whereupon a vacuum is applied in order to infiltrate the fiber material with the matrix. This configuration basically corresponds to the vacuum infusion method known per se and represents an alternative to the RTM method. In the present case, "film" also comprises a semi-permeable membrane.

According to a further configuration of the method according to the invention, the fiber material is arranged on the first and/or the second mold prior to the formation of the second cavity. The fiber material is thus preferably arranged on the first and/or the second mold when the molds are open, and the molds are subsequently closed to form the second cavity with the fiber material inside.

According to a further configuration of the method according to the invention, the first and/or the second mold have a shell shape. Alternatively, at least one of the two molds can have a U-shaped cross-section. These mold shapes are particularly suitable for forming the second cavity between them.

According to a further configuration of the method according to the invention, the casting material has a melting point which is below the decomposition temperature of the matrix. "Decomposition temperature" is to be understood to mean the temperature at which the polymer chains in the matrix thermally decompose. This configuration is advantageous in that, when the first and the second mold are heated after the step of curing the matrix, in order thereby to melt the casting material, a disadvantageous decomposition of the matrix is avoided.

According to a further configuration of the method according to the invention, the fiber material and the casting material are heated via the same heater in order to infiltrate and/or cure the fiber material and melt the casting material. Thus, advantageously, only one heater is required.

According to a further configuration of the method according to the invention, the casting material is heated via a first heater in order to melt said casting material and the fiber material is heated via a second heater in order to infiltrate and/or cure said fiber material. As a result, the temperature of the casting material can advantageously be controlled independently of that of the fiber material and of the fiber material comprising the matrix.

According to a further configuration of the method according to the invention, the casting material is formed as a lead-zinc alloy, in particular having a melting point between 183 and 195° C. Alloys of this type are particularly suitable owing to their low melting point. Alternatively, the casting material could also be formed as a polymer, in particular as a plastics material or silicone.

BRIEF DESCRIPTION OF THE DRAWINGS

The invention is described in detail below by way of embodiments with reference to the appended figures of the drawings, in which:

FIG. 2A to 2C are each a sectional view through a device according to a further embodiment of the present invention in various operating states.

In the figures, like reference numerals denote like or functionally like components unless stated otherwise.

DETAILED DESCRIPTION OF THE EMBODIMENTS

Figures 1A, 1B, 1C:
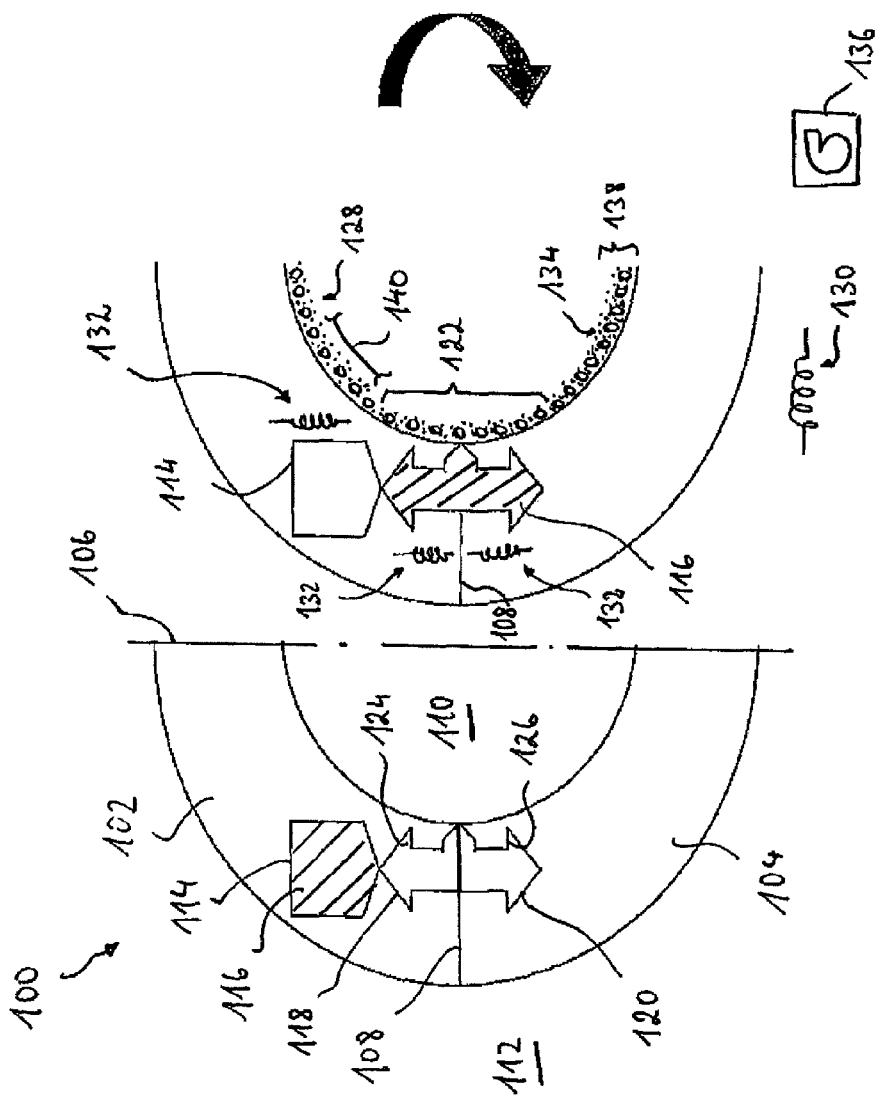
FIG. 1A to 1C are each a sectional view through a device according to an embodiment of the present invention in various operating states.
Figure 3:
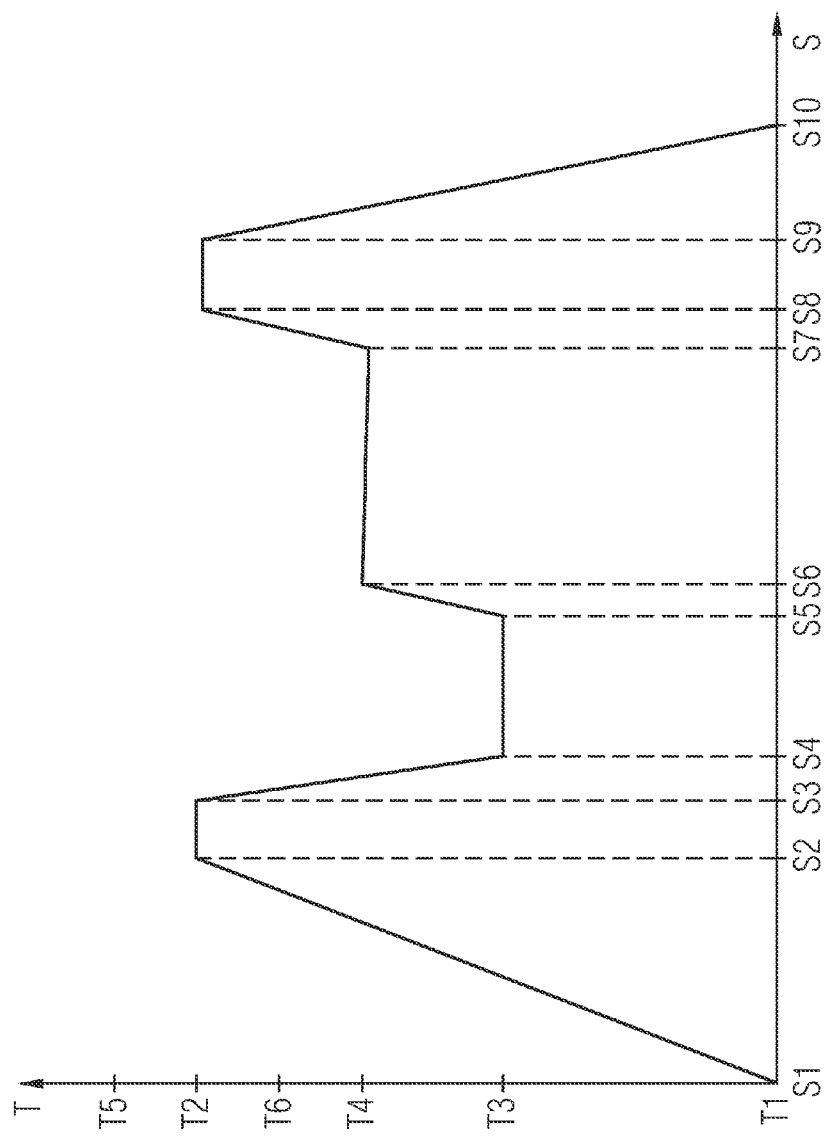
FIG. 3 shows a temperature profile for the device according to FIG. 1A to 1C or 2A to 2C.

FIG. 1A is a sectional view of a device 100 according to an embodiment of the present invention in a first operating state.

The device 100 comprises a first and a second mold 102, 104. According to the present embodiment, the device 100 is formed symmetrically about an axis of symmetry 106. The following descriptions thus apply accordingly for the right-hand side (not shown in FIG. 1A) of the device 100.

According to the present embodiment, the first and the second mold 102, 104 are each formed as a half-shell, which half-shells rest against one another along a joint 108 in the closed state shown in FIG. 1A. The molds 102, 104 thus complement one another to form a cylinder, the end faces of which (not shown, since these are located outside the plane of projection) can respectively also comprise a joint corresponding to the joint 108 or be closed in another manner. The molds 102, 104 define between them a cavity 110 which, in the operating state shown in FIG. 1A, is connected to the atmosphere 112 via the joint 108, which does not ensure pressure-tight closure.

The mold 102, which in FIG. 1A is arranged at the top in relation to the ground (not shown), comprises a chamber 114. In the first operating state shown in FIG. 1A, the chamber 114 is filled with a casting material 116 in a solid state. Below the chamber 114, the first mold 102 comprises a recess 118 which is open towards the joint 108. Opposite the recess 118, the second mold 104 comprises a recess 120 which is also open toward the joint 108. When the first and second molds 102, 104 are closed, as shown in FIG. 1A, the recesses 118, 120 together form a cavity 122. The cavity 122 is closed apart from an opening towards the chamber 114. The recesses 118, 120 can comprise an undercut 124, 126 at their respective end remote from the joint 108. Alternatively, FIG. 2A to 2C show an embodiment of the device 100 which does not comprise the undercuts 124, 126.

The closed state of the molds 102, 104 is preceded by an open state of the molds 102, 104 in which a fiber material is arranged in the cavity 110, which is accessible from the outside when the molds 102, 104 are open. For better clarity, the fiber material is shown only in FIG. 1B and denoted by reference numeral 128. The fiber material 128 can in particular be a fiber preform which was constructed in a preceding method step and in particular fills the entire cavity 110 (not shown). For example, the fiber preform can consist of a plurality of non-woven layers which are sewn together or interconnected by means of a powder binder. When the molds 102, 104 are open, the fiber material 128 is arranged on each of them or only on one of the two molds 102, 104. The molds 102, 104 are then brought into their closed state shown in FIG. 1A to 10, but the cavity 110 remains connected to the atmosphere 112 via the joint 108 owing to certain leaks.

The casting material 116 is then heated. The casting material 116 can in particular be a meltable metal, for example a lead-zinc alloy. The casting material 116 can be heated in a variety of ways. For example, the device 100 can comprise a heater 130 which is formed to heat the first and the second mold 102, 104 collectively, the casting material 116 then also being heated. For better clarity, the heater 130 is shown only in FIG. 1B. Alternatively or additionally, a heater 132 can be provided in the immediate vicinity of the chamber 114 and the cavity 122, which heater is set up to heat basically only the casting material 116 in the chamber 114 and in the cavity 122 (see FIG. 1B).

The following descriptions relate to a heating process using exclusively the heater 130. In this case, the casting material 116 and the fiber material 128 comprising the matrix 134 have basically the same temperature profile, shown in FIG. 3. The heater 130 can be integrated into one of the two molds 102, 104 or into the two molds 102, 104.

Starting from the solid state of the casting material 116, which at this time S1 (see FIG. 3) has a temperature T1 (typically ambient temperature), said casting material is heated to a temperature T2 at a time S2. The temperature T2 is higher than the melting point T6 of the casting material 116. The melting point T6 is typically 185° C. The temperature T2 may be 190° C., for example. The casting material 116 then flows downwards into the cavity 122 owing to the effect of gravity and fills said cavity (see FIG. 1B).

The temperature T2 of the casting material 116 in the cavity 122 is then reduced again at a time S3, in such a way that the casting material 116 assumes the temperature T3 at a time S4. The temperature T3 is selected in such a way that it is suitable for infiltrating the fiber material 128 with a matrix 134 (see FIG. 1B). In other words, at the time S4 the first and the second mold 102, 104 have a temperature T3 at which the matrix 134 is sufficiently free-flowing to infiltrate the fiber material 128. The temperature T3 is typically 120° C. At this temperature the casting material 116 has solidified again and thus seals the joint 108 (see FIG. 1B) in a gas-tight and liquid-tight manner. Owing to the undercuts 124, 126, when solid (see FIG. 1B) the casting material 116 also rigidly interconnects the molds 102, 104 in a direction perpendicular to the joint 108.

In a further method step, a vacuum is then applied to the cavity 110, which is sealed in a pressure-tight manner apart from a corresponding vacuum connection, and the matrix 134 is conveyed under pressure into the fiber material 128. The applied vacuum ensures that in particular all the gas bubbles are removed from the matrix 134, which advantageously influences the quality of the fiber composite component produced. A corresponding vacuum pump for producing the vacuum is denoted by reference numeral 136 in FIG. 1B.

For example, the infiltration of the fiber material 128 with the matrix 134 may be complete at a time S5 (see FIG. 3), whereupon the temperature of the first and the second mold 102, 104 and thus of the fiber material 128 including the matrix 134 is increased to the temperature T4 at a time S6. The temperature T4 corresponds to a curing temperature for curing the matrix 134. The curing temperature T4 is, for example, 180° C. and is thus lower than the melting point T6 of the casting material 116, in order not to compromise the tightness of the molds 102, 104.

After curing the matrix 134 at a time S7 (see FIG. 3), the molds 102, 104 are rotated in such a way that the cavity 122 is henceforth arranged at the top in relation to the chamber 114 (see FIG. 1C). The rotation of the molds 102, 104 is indicated by an arrow between FIGS. 1B and 1C. At a time S8 (see FIG. 3), the temperature of the casting material 116 is then brought back to the temperature T2 above the melting point T6 of the casting material 116.

The temperature T2 is lower than a decomposition temperature T5 of the matrix 134, and so the matrix 134 is not damaged when heated (owing to the heating of the casting material 116) at time S8.

The casting material 116 in the cavity 122 then melts and subsequently flows into the chamber 114 owing to the effect of gravity. The molds 102, 104 can thus be re-opened and the then finished fiber composite component 138 (see FIG. 1B) removed.

From a time S9 (see FIG. 3), the casting material 116 in the chamber 114 cools from the temperature T2 back to a temperature below the melting point T6, in particular to the temperature T1 (ambient temperature). The molds 102, 104 can then be rotated again and thus brought into the operating state shown in FIG. 1A.

According to an alternative embodiment, the heater 132 can also be provided. In this case, the temperature of the casting material 116 in the chamber 114 and in the cavity 122 can be controlled basically independently of the temperature of the fiber material 128 and of the fiber material 128 including the matrix 134. The casting material 116 could thus have the temperature profile shown in FIG. 3 until the time S4, while the fiber material 128 is basically at the temperature T1, that is to say ambient temperature. In this case, the temperature of the casting material 116 is controlled via the heater 132. The temperature of the fiber material 128 is then brought to the temperature T3 in order to make it possible to infiltrate said fiber material with the matrix 134, which requires sufficient fluidity of the matrix 134. This is done via the heater 130, which in this embodiment heats only the cavity 110 comprising the fiber material 128. In the time frame S4 to S7, the temperature of the casting material 116 can again be the temperature T1 (ambient temperature) or a slightly higher temperature (owing to the waste heat from the cavity 110). When curing of the matrix 134 is complete at time S7, the temperature of the fiber material 128 comprising the matrix 134 is lowered to the temperature T1 (ambient temperature) again, while the temperature of the casting material 116 is increased via the heater 132 to the temperature T2 to melt the casting material 116.

The temperature T2 (see FIG. 3) in the time frame S2 to S3 can also be above the decomposition temperature of the matrix 134, since this is only introduced into the cavity 110 afterwards.

According to a further embodiment, a film 140 (see FIG. 1B) is laid over the fiber material 128 on the inside before or after closing the molds 102, 104. For this purpose, the fiber material 128 is for example arranged in the form of one or more layers (the embodiment having one layer is shown in FIG. 1B) on the molds 102, 104. In other words, the fiber material 128 does not fill the cavity 110, as is preferably the case in the previous embodiment. For better clarity, FIG. 1B shows only a short portion of the film 140. The film 140 is then sealed from the molds 102, 104, for example by means of a sealing tape (not shown). A vacuum is then applied by means of the vacuum pump 136 to the volume formed between the foil 140 and the molds 102, 104. As a result, the matrix 134 is drawn into the formed volume, said matrix then infiltrating the fiber material 128. In this case, the end faces of the cylinder formed by the first and the second mold 102, 104 can be formed in an open, that is to say pressure-conducting manner, since a vacuum does not need to be applied to the cavity 110. In this case, the configurations described in connection with FIG. 1A to 1C apply accordingly.

FIG. 2A to 2C show a further embodiment of the device 100, FIG. 2A to 2C corresponding to FIG. 1A to 10.

In contrast to the embodiment according to FIG. 1A to 10, in the embodiment according to FIG. 2A to 2C each of the molds 102, 104 has a U-shaped cross-section. A respective U-shape is made up of two arms 200 (owing to the mode of representation in FIG. 2A to 2C only one of the arms 200 is shown) and an arm 202 connecting the arms 200. This results in a rectangular cross-section for the cavity 110, in such a way that fiber composite components 138 having a rectangular outer geometry can be produced therein.

In addition, each of the recesses 118, 120 is semi-circular, in such a way that the cavity 122 has a circular or oval cross-section. The cavity 122 and the recesses 118, 120 have no undercut, in such a way that in the state shown in FIG. 2B the casting material 116 merely ensures sealing of the joint 108 and does not interconnect the first and the second mold 102, 104 with a positive fit, as is the case in the embodiment according to FIG. 1A to 10. For the sake of simplicity, the fiber composite material 138 and the components 128, 134 thereof are not shown in FIG. 2A to 2C.

Although the invention has been described herein by way of preferred embodiments, it is in no way limited thereto, but rather can be modified in a variety of ways. In particular, the configurations and embodiments described herein for the method according to the invention can be applied accordingly to the device according to the invention and vice versa. Furthermore, in the present case "a" does not rule out a plurality.

What is claimed is:
1. A method for producing a fiber composite component, comprising:
    arranging a first and a second mold in relation to one another such that these together form a first cavity;
    laying a fiber material on the first and/or second mold;
    filling the first cavity with a casting material and solidifying the casting material in order to seal the first and the second molds to one another and/or interconnect the first and second molds; and
    infiltrating the fiber material with a matrix and curing the matrix to form the fiber composite component,
    wherein the casting material comprises a lead-zinc alloy.
2. The method according to claim 1, wherein the first mold comprises a first recess and the second mold comprises a second recess, which recesses together form the first cavity.
3. The method according to claim 2, wherein the first and the second recess each comprise an undercut, such that the first and the second mold are interconnected with a positive fit after filling with and solidification of the casting material.
4. The method according to claim 1, wherein the casting material is melted again after the matrix has solidified, whereby the seal and/or the connection between the first and the second mold is removed.
5. The method according to claim 1, wherein the first and the second mold are arranged in relation to one another such that they together form a second cavity, at least in portions, which cavity receives the fiber material, whereupon the first and the second mold are sealed to one another by filling the first cavity with the casting material and solidifying the casting material.
6. The method according to claim 5, wherein a pressure or vacuum is applied to the second cavity in order to infiltrate the fiber material in the second cavity with the matrix.
7. The method according to claim 1, wherein the fiber material is packed in a film which is sealed from the first and the second mold, whereupon a vacuum is applied in order to infiltrate the fiber material with the matrix.
8. The method according to claim 1, wherein the melting point of the casting material is below a decomposition temperature of the matrix.
9. The method according to claim 1, wherein the fiber material and the casting material are heated via a same heater to infiltrate and/or cure the fiber material and melt the casting material.
10. The method according to claim 1, wherein the casting material is heated via a first heater to melt the casting material and the fiber material is heated via a second heater to infiltrate and/or cure the fiber material.
11. The method according to claim 4, wherein the first and second molds are turned over prior to re-melting the casting material such that the first cavity is arranged above the chamber, whereby the casting material flows from the first cavity back into the chamber once the casting material has been melted.

12. The method according to claim 1, wherein the melting point of the casting material is from 183 to 195° C.

13. The method according to claim 1, wherein a chamber contains the casting material prior to filling the first cavity, the casting material flowing from the chamber into the first cavity when the casting material is heated beyond a melting point thereof.

14. The method according to claim 13, wherein the chamber is formed in the first and/or the second mold.

15. The method according to claim 13, wherein the chamber is arranged above the first cavity prior to the filling step.

* * * * *